United States Patent [19]
Singh

[11] 3,769,616
[45] Oct. 30, 1973

[54] SOLID STATE RADIOFREQUENCY CIRCUITS

[75] Inventor: Digjit Singh, Waltham, Mass.

[73] Assignee: Bell & Howell Company, Chicago, Ill.

[22] Filed: Feb. 10, 1972

[21] Appl. No.: 225,203

[52] U.S. Cl. ................. 333/73 S, 333/76, 333/84 M
[51] Int. Cl. ......................... H03h 13/00, H01p 3/08
[58] Field of Search ...............334/41–45; 333/84 M, 73 S, 76, 77; 317/101 B; 336/200; 330/66

[56] References Cited

UNITED STATES PATENTS

| | | | |
|---|---|---|---|
| 2,751,558 | 6/1956 | Grieg et al. | 333/73 S |
| 3,217,275 | 11/1965 | Duncan et al. | 333/76 |
| 2,601,338 | 6/1952 | Snyder | 333/76 |
| 2,951,149 | 8/1960 | Grieg et al. | 333/84 M |
| 2,610,248 | 9/1952 | Reid | 330/66 X |
| 2,896,028 | 7/1959 | Mackey | 336/200 X |
| 3,487,339 | 12/1969 | Griedentrog | 333/77 X |

FOREIGN PATENTS OR APPLICATIONS

| | | | |
|---|---|---|---|
| 1,191,592 | 10/1959 | France | 317/101 B |
| 632,834 | 12/1949 | Great Britain | 333/84 M |

*Primary Examiner*—Rudolph V. Rolinec
*Assistant Examiner*—Wm. H. Punter
*Attorney*—Rosen & Steinhilper

[57] ABSTRACT

The disclosure shows a planar equivalent of a helical resonator made in the form of a micro-strip line coiled into a helix on one side of a dielectric board having on the other side a ground plane conductor. The inductance of the helix and the distribution capacitance between the helix and the ground plane are made to resonate at a frequency in a narrow band in the radiofrequency spectrum encompassing a few hundred to several hundred megahertz.

5 Claims, 4 Drawing Figures

SOLID STATE RADIOFREQUENCY CIRCUITS

BACKGROUND OF THE INVENTION

This invention relates in general to radio frequency circuits in the spectrum encompassing a few hundred to several hundred megahertz, and more particularly to a planar equivalent for the bulky helical resonator structures that are frequently used, for example, to provide an image trap in tuned radio frequency systems.

In very small radio receivers, transponders and the like, such as paging receivers and pocket-size communication transponders, where not only bulk and weight are important factors, but also the radio frequency circuits must be electrically precise and mechanically rugged, it is important to provide components that satisfy a unique combination of requirements of electrical reliability, mechanical ruggedness and stability, small size and low weight. The helical resonator which is well-known, comprising essentially a coil in a can, is frequently used where its high-Q properties are required, as in the image trap of the first RF stage of a radio receiver. In the pass band of, for example, 450–470 MHz this is a bulky component, and its bulk becomes objectionable in very small receivers and transponders, especially of the pocket-size variety. Moreover, being a coil in a can, the helical resonator is inherently not suitable for use in these receivers since they are subject to mechanical shock, and vibration of the coil in the can may change tuning of a circuit in which the resonator is installed, such as an image trap.

GENERAL NATURE OF THE INVENTION

According to the present invention, a flat coil of electrical conductor is fixedly supported on one surface of a sheet of dielectric having at the opposite surface a distributed electrical conductor forming a ground plane. The coil has a plurality of turns with a prescribed spacing between adjacent turns chosen to exhibit M-coupling between the turns such that the inductance of the coil at a prescribed frequency in the radiofrequency spectrum encompassing a few hundred to several hundred megahertz (e.g: 450–470 MHz) is substantially the same as that of a substantially longer flat strip uncoiled conductor similarly supported, the dielectric constant and thickness of the dielectric sheet being configured to provide distributed capacitance between the coil conductors and the distributed conductor of a magnitude to resonate with this inductance at a frequency in a substantially narrow band within that spectrum. Included on the same surface as the coil is a second flat strip of electrically conductive material but spaced a prescribed distance from the outer turn of the coil for coupling an electric wave signal (e.g: received RF signal) into the coil, the spacing distance being chosen to provide relatively tight coupling for a signal having a frequency in the same spectrum. The coil may be used in an image trap circuit and the second strip may be used as the inductor in a tank tuned to RF in the antenna input to the first RF amplifier of a receiver, for example, for coupling received RF signal energy to the image trap. There is thus provided in a single solid state passive structure of the micro-strip planar variety the planar equivalent of a helical resonator together with the entire RF transformer for coupling the RF signal to the coil.

It is a principal object of the invention to improve the RF structures of small size radio receivers, transponders, and the like.

Another important object is to provide compact physically rugged and electrically reliable solid state structures forming an equivalent of prior-art helical resonators.

A further object of the invention is to provide a planar equivalent of a helical resonator, more particularly in a structure suitable for use in the image-rejection circuits of the RF stages of such receivers, transponders and the like.

A general object of the invention is to provide radio receivers, transponders and the like incorporating such improved components.

Those and other objects and features of the invention will be apparent from the following description of an embodiment. This description refers to the accompanying drawings, in which.

Figure 1:
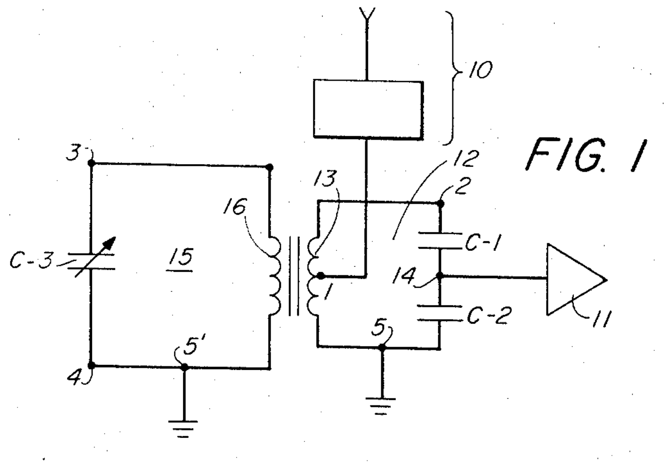
FIG. 1 is a circuit diagram showing the RF input to a typical radio receiver to which the invention is addressed.

In FIG. 1, an RF signal incident upon an antenna system 10 is coupled to the first RF amplifier 11 via a broadly-tuned input tank circuit 12. The tank circuit is composed of an inductor 13 having two ends 2 and 5, respectively, and an intermediate tap 1, to which the antenna system is connected. A pair of capacitors C-1 and C-2 are series connected across the ends 2 and 5 of the inductor and their common junction 14 feeds the amplifier 11. One end 5 of the inducator is grounded.

A high-Q image trap 15 comprised of an inductor 16 and a tunable capacitor C-3 is inductively coupled tightly to the input tank circuit 12. This trap is tuned to an image frequency, according to well-known practice, and is accordingly tunable to resonate at a frequency in a narrow band within the spectrum of the receiver RF signal to which the broadly-tuned input tank 12 is tuned. The image trap inductor has two ends 3 and 5′, respectively, the latter end being grounded. The capacitor C-3 is connected at one side to the inductor at its first end 3 and at the other side to the other end 5′ via a terminal 4, which is also grounded.

Figure 3:
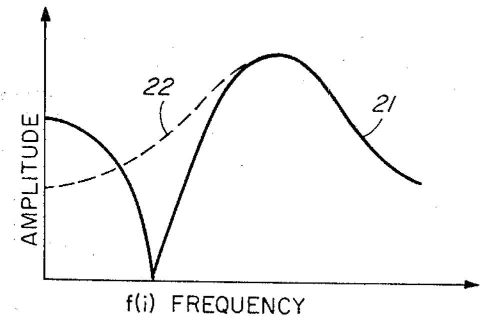
FIG. 3 is a graph useful to explain a use of the invention.

FIG. 3 shows in a graphic form the intended function of the image trap 15. The amplitude of incoming RF signal supplied to the amplifier 11 varies with respect to frequency as is indicated by the solid graph line 21. At a frequency $f(i)$ in a sharply-tuned narrow band the image trap drops the amplitude essentially to zero. Without the image trap, the amplitude would generally be as represented by the dashed line 22 in a portion of the spectrum overlapping the image frequency $f(i)$. Heretofore it has been customary to employ a helical resonator, for its high-Q properties, to achieve this function.

Figure 2:
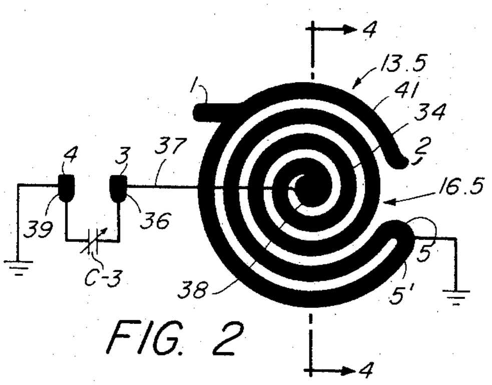
FIG. 2 shows the layout of a planar conductor structure according to the invention.
Figure 4:
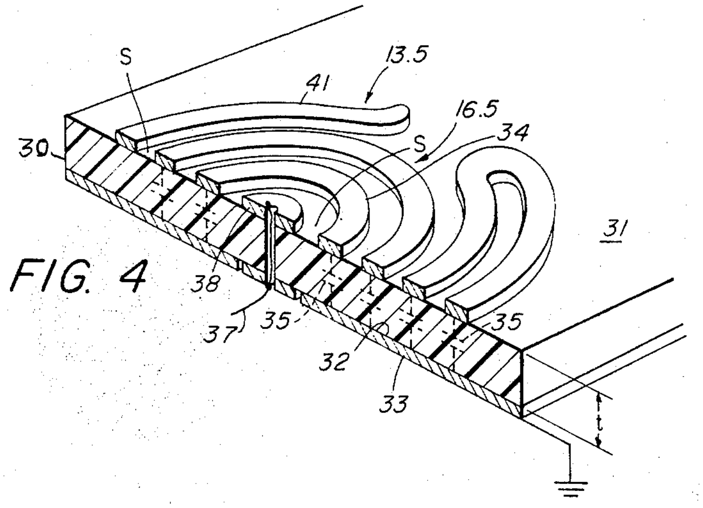
FIG. 4 is a section along line 4—4 of FIG. 2 of a planar structure according to the invention.

FIGS. 2 and 4 illustrate the present invention. A dielectric board or sheet of thickness "$t$" having two flat or "planar" wide sides 31 and 32 supports the electrical elements. A layer 33 of electrically conductive material covers one surface 32, and functions as a ground plane. A flat strip 34 of electrically conductive material forms a helical coil on the opposite surface 31 of the dielectric board. This coil has a plurality of turns with a prescribed spacing "*s*" between adjacent turns chosen to exhibit M-coupling between the turns such that the inductance of the coil at a prescribed frequency in the RF spectrum encompassing a few hundred to several hundred megahertz (e.g: 450–470 MHz) is the same as that of a longer flat strip uncoiled conductor similarly supported. In this way physical size of the inductor is reduced to a minimum. The dielectric constant and thickness of the board 30 are chosen to provide distributed capacitance (indicated by dashed line capacitors 35) between the strip 34 forming the coil 16.5 and the ground plane 33 of a magnitude to resonate with this inductance at a frequency in a narrow band within the broader RF spectrum. In this way the coil 16.5, dielectric 30 and ground plane 33 form a rigid planar structure which is the equivalent of a helical resonator of the prior art, but smaller in size, mechanically rigid, and electrically more precise in its properties and specifications than such prior helical resonators, as well as being potentially less costly to fabricate, handle and install. The terminal numbers 3 and 5 shown in FIG. 2 correspond to the similarly-numbered terminals in FIG. 1, it being noted that a separate terminal spot 36 for use as terminal 3 is formed on the upper surface 31 of the board (as shown in FIG. 2), for convenience in connecting the tunable capacitor C-3 in the trap 15; a wire 37 is used to connect this spot 36 to the inner end 38 of the coil 16.5. Another terminal spot 39 is formed on the upper surface 31 of the board (FIG. 2) to serve as terminal 4 in the image trap 15.

A second flat strip 41 of electrical conductor on the upper surface 31 of the board 30 is adjacent to but spaced a prescribed distance from the outer turn of the coil 16.5, to serve as an inductor 13.5 corresponding to the inductor 13 in the input tank 12. This strip 41 is spaced to be tightly coupled to the coil 16.5 at frequencies in the specified RF spectrum, and its ends 2 and 5 correspond to the terminals 2 and 5 of the inductor 13 in FIG. 1; an intermediate tap 1 is provided on it corresponding to the intermedaite tap 1 on the inductor 13 in FIG. 1. The grounded ends 5 and 5' of conductors 34 and 41 are connected together and grounded. intermediate Typical dimensions and electrical parameters for a structure according to FIGS. 2 and 4 intended for use in the RF spectrum 450–470 MHz are as follows:

- Radius of outer turn of helix = 0.291 in. (max)
- Turns of helix equally spaced, one from the other, (from edge of one conductor to adjacent edge of next conductor) $s = 0.010$ in.
- Width of helix conductor = 0.037 in.
- Number of turns in helix = 5
- Board 30 thickness "*t*" = 1/16 in.
- Material = Teflon with glass fibers
- Dielectric constant = 2.5
- Capacity from center 38 of coil to ground 33 (tunable via C-3) = 0.5 pf to 2 pf
- Inductance of the helix coil = 80 nanohenry
- $Z_0$ of the structure = 10 ohms to 100 ohms, depending on design
- Capacitance from conductor 41 of primary coil 13.5 to ground 33 = 1.6 pf
- The conductors 34, 41, 33 are made of 2 oz copper with a finish = 0.00005 in. gold plate With a resonator and coupling inductor as described above, an RF input stage may be constructed according to FIG. 1 in which an image that is only 42.8 MHz away from the desired signal (10 percent bandwidth) will be attenuated more than 20 db.

The above-described embodiment is exemplary only. Other structures embodying the invention will occur to those skilled in the art. It is intended therefore that the scope of the invention be measured not by this disclosure but rather by the appended claims.

I claim:

1. A planar equivalent of a helical resonator comprising a sheet-form dielectric member having a prescribed thickness, a layer of electrically-conductive material on one surface of said member, and a flat strip of electrically conductive material forming a helical coil on the opposite surface of said member, said coil having a plurality of turns with a prescribed spacing between adjacent turns chosen to exhibit M-coupling between the turns such that the inductance of said coil at a prescribed frequency in the radiofrequency spectrum encompassing a few hundred to several hundred megahertz is substantially the same as that of a substantially longer flat strip uncoiled conductor similarly supported, the dielectric constant and thickness of said member being configured to provide distributed capacitance between said strip and said layer of a magnitude to resonate with said inductance at a frequency in a substantially narrow band within said spectrum, and in combination with said resonator a second flat strip of electrically conductive material on said opposite surface adjacent but spaced a prescribed distance fromthe outer turn of said coil for coupling an electric wave signal into said coil, said distance being chosen to from the relatively tight coupling for a signal having a frequency in said spectrum.

2. A resonator according to claim 1 in which both of said flat strip conductors are connected together at one end of each to said layer as a common ground.

3. A resonator according to claim 1 in which said second strip has terminal means intermediate its ends for introduction of said electric wave signal.

4. A radio-frequency receiver system including resonator means according to claim 1, said system having antenna means for receiving an electric wave signal in said spectrum, (said signal comprising a first sideband containing desired information and an image thereof in a second sideband, radio-frequency circuit means for transducing said signal,) means coupling said (radio-frequency circuit) antenna means to said (resonator for removing said second sideband from said signal) second flat strip, and means to tune said resonator to a trap frequency (centered in said second sideband) within said spectrum.

5. A receiver system according to claim 4 in which (said coupling means comprises a second flat strip of electrically conductive material on said opposite surface adjacent but spaced a prescribed distance from the outer turn of said coil, said distance being chosen to provide relatively tight coupling for electric wave energy having a frequency centered in said second sideband,) one end of said second flat strip conductor (being) is connected to the outermost end of said coil and both said ends (being) are connected to said layer, and having terminal means intermediate the ends of said second strip for coupling to said antenna means.

* * * * *

PO-1050
(5/69)

UNITED STATES PATENT OFFICE
CERTIFICATE OF CORRECTION

Patent No. 3,769,616 Dated October 30, 1973

Inventor(s) Digjit Singh

It is certified that error appears in the above-identified patent and that said Letters Patent are hereby corrected as shown below:

Column 2, line 27, change "of" (first occurrence) to --in-- line 44, change "receiver" to --received--

Column 3, lines 44 and 45, delete "intermediate"

Column 4, line 34, change "from" to --provide-- line 35, delete "the"

Signed and sealed this 8th day of April 1975.

(SEAL)
Attest:

RUTH C. MASON
Attesting Officer

C. MARSHALL DANN
Commissioner of Patents
and Trademarks